US010200732B1

(12) United States Patent
Montgomery et al.

(10) Patent No.: US 10,200,732 B1
(45) Date of Patent: Feb. 5, 2019

(54) OUTPUT-ALIGNED AVAIL BLANKING FOR VIDEO STREAMS

(71) Applicant: Amazon Technologies, Inc., Seattle, WA (US)

(72) Inventors: David Montgomery, Portland, OR (US); William Kennemer, Milwaukie, OR (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/343,058

(22) Filed: Nov. 3, 2016

(51) Int. Cl.
*H04N 21/2662* (2011.01)
*H04L 29/06* (2006.01)
*H04N 21/633* (2011.01)
*H04N 21/234* (2011.01)
*H04N 21/236* (2011.01)

(52) U.S. Cl.
CPC ..... *H04N 21/2662* (2013.01); *H04L 65/4069* (2013.01); *H04L 65/602* (2013.01); *H04N 21/234* (2013.01); *H04N 21/23602* (2013.01); *H04N 21/633* (2013.01)

(58) Field of Classification Search
CPC ............. H04N 21/236; H04N 21/2662; H04N 21/234; H04N 21/23602; H04N 21/633; H04L 65/4069; H04L 65/602
See application file for complete search history.

(56) References Cited

U.S. PATENT DOCUMENTS

| 8,134,640 | B2 | 3/2012 | Doswald |
| 9,380,092 | B2 | 3/2016 | Wada et al. |
| 9,369,506 | B2 | 6/2016 | Bhardwaj et al. |
| 9,414,100 | B2 | 8/2016 | Van Veldhuisen |
| 9,426,519 | B1 | 8/2016 | Lewis et al. |
| 9,462,328 | B2 | 10/2016 | Panje et al. |
| 2009/0199230 | A1* | 8/2009 | Kumar ............... G06Q 30/02 725/32 |
| 2014/0118537 | A1* | 5/2014 | Weatherhead ......... H04H 60/45 348/135 |

OTHER PUBLICATIONS

"Digital Program Insertion Cueing Message for Cable", Society of Cable Telecommunication Engineers, ANSI/SCTE 35 2013, 2013, pp. 1-44.

(Continued)

*Primary Examiner* — Hunter B Lonsberry
(74) *Attorney, Agent, or Firm* — Robert C. Kowert; Meyertons, Hood, Kivlin, Kowert & Goetzel, P.C.

(57) ABSTRACT

Methods, systems, and computer-readable media for output-aligned avail blanking for video streams are disclosed. Frame-rate conversion is performed on a video input. The video input is associated with a starting point in time for a break such as an avail break, and the video input has an input frame rate. The frame-rate conversion generates one or more video outputs whose frame rates may differ from the input frame rate. Blanking is performed on the video outputs after the frame-rate conversion. The blanking comprises modifying or inserting a sequence of frames, and a beginning of the sequence of frames is aligned with an indication of a start of the break. For multiple video outputs, a starting frame for the break is selected from the output having the lowest frame rate so that the start of the break is synchronized across the video outputs.

20 Claims, 10 Drawing Sheets

(56) References Cited

OTHER PUBLICATIONS

Jan Ozer, "Everything You Ever Wanted to Know About IDR Frames but Were Afraid to Ask", Streaming Learning Center, Retrieved from URL: http://www.streaminglearningcentercomarticleseverythingyoueverwantedtoknowaboutidrframesbutwereafraidtoask.html on Oct. 25, 2016, pp. 1-7.

* cited by examiner

OUTPUT-ALIGNED AVAIL BLANKING FOR VIDEO STREAMS

BACKGROUND

Internet-based video streaming is increasingly the choice of viewers who seek convenient access to video outside of conventional video distribution channels (including over-the-air broadcasts, cable TV, satellite TV, and prerecorded physical media). Using streaming technologies, viewers may access channels of live video as well as prerecorded video from libraries of video assets that are accessible over an Internet connection. In some cases, streaming video is viewable on a wide range of devices, including desktop computers and laptop computers, tablets, smartphones, wearable computers, and specialized devices such as smart televisions. The flexibility and convenience of streaming video are responsible in part for its widespread adoption.

The distribution and delivery pipeline for streaming video is typically a complicated one. A video asset or live stream may first be acquired, e.g., from a broadcaster. The video may then be processed and transformed in any of several ways (potentially including compression, encryption, and other forms of encoding) for eventual distribution to viewers. A particular video asset or live stream may be compressed at a particular bitrate. A hierarchy of servers over a wide geographical area may be used to deliver the video to many viewers in an efficient manner. A viewer may then attempt to play the video on a viewing device.

Figure 1:
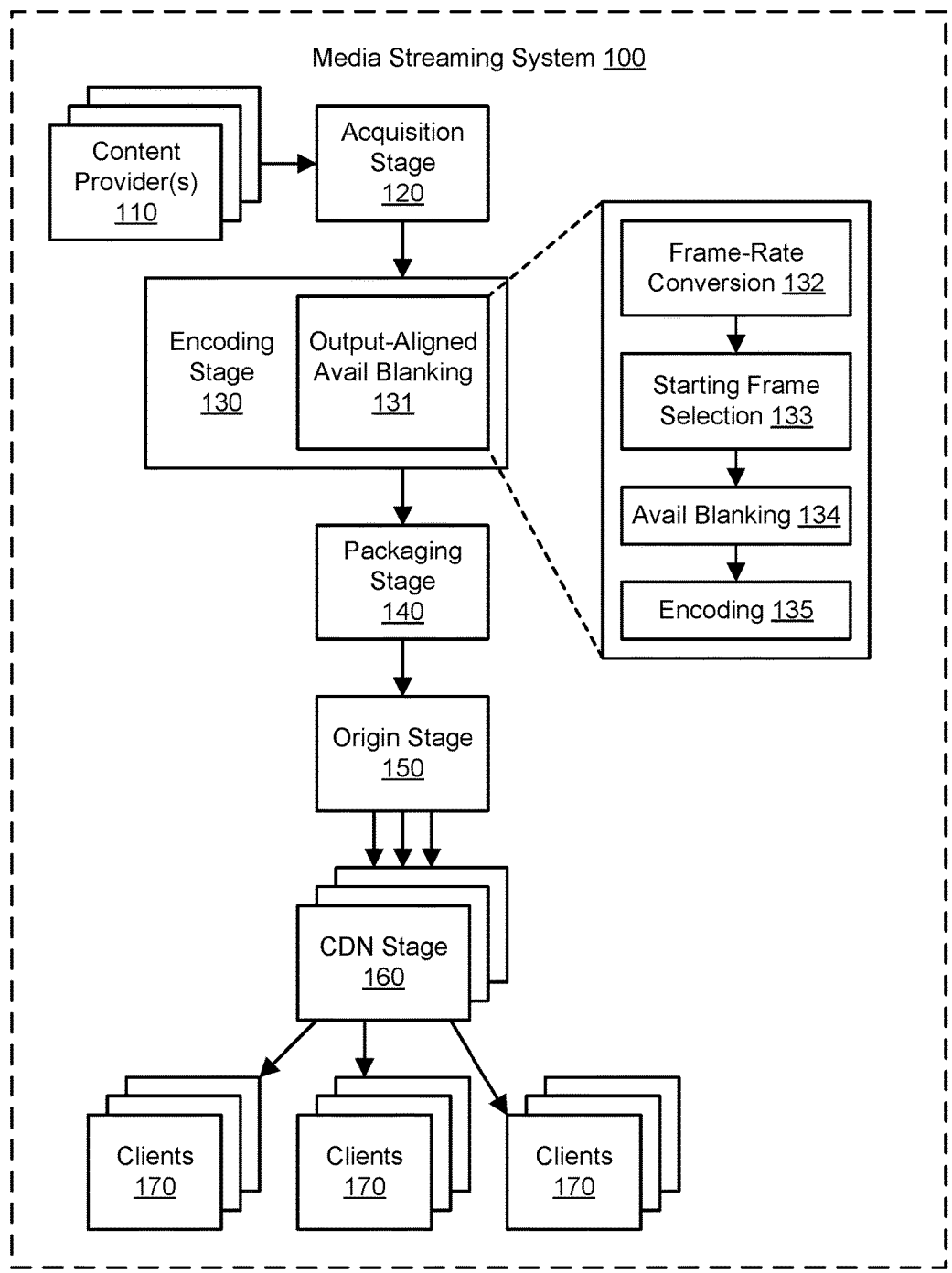
FIG. 1 illustrates an example system environment for output-aligned avail blanking for video streams, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for output-aligned blanking, such as avail blanking, for video streams are described. Using the techniques described herein, a media streaming system may be implemented as part of a delivery pipeline for streaming media, including streaming video with audio. Some video streams may be modified by the media streaming system to include breaks, such as avail breaks. Avail breaks may represent breaks, portions, or segments of a video in which additional video content, such as advertisements, may be inserted, for example by a downstream component or other entity (e.g., local broadcasters). Avail breaks may also represent the start or end of one program within a stream, the start or end of a stream itself, and other suitable disruptions or discontinuities in media content. Using prior approaches, avail breaks have been inserted into video streams prior to frame-rate conversion of a video input to one or more video outputs. To create the avail break, a sequence of frames may be blacked out or replaced with a pre-configured slate image, and also signals may be associated with the first frame and last frame of the break to indicate the boundaries of the break to downstream components. However, frame-rate conversion (e.g., of a 24 frames per second [fps] input to a 30 fps output) performed after insertion of the avail break may misalign the first blanked frame and the corresponding signal, such that the signal may be incorrectly associated with a different frame than the first blanked frame. Additionally, frame-rate conversion performed after insertion of the avail break may cause avail breaks to begin at different times in video outputs having different frame rates. Using the techniques described herein, frame-rate conversion may be performed before avail blanking instead of after. In this manner, signals indicating the start and/or end of an avail break may reliably be aligned to the first and/or last frames of the avail break (e.g., with no intermediate frames between the first frame and the signal). For multiple video outputs having different frame rates, a starting frame for the avail break may be selected from the video output having the lowest frame rate so that the start of the avail break may be synchronized across the video outputs. Avail breaks may thus be aligned properly within individual video streams and/or synchronized across multiple video streams to prevent undesired errors when additional content is inserted downstream.

FIG. 1 illustrates an example system environment for output-aligned avail blanking for video streams, according to one embodiment. A media streaming system 100 may implement a media delivery pipeline to stream media, such as digital video or audio or a combination thereof, to client computing devices 170 for further processing and/or playback using those devices. The media may represent live media content (e.g., a live stream associated with a particular channel) or prerecorded media content (e.g., a media asset from a library of streamable media). The pipeline may include multiple stages; the stages may represent various transformations of the media and/or various distribution paths for the media (e.g., from device to device over the internet). A media stream may comprise a multichannel media stream in which multiple channels of content are packaged together. The multiple channels may typically represent different content, and a recipient may select one of the channels from the multichannel stream (e.g., for viewing). Alternatively, a media stream may comprise a single channel of media.

The client computing devices 170 may be associated with and/or operated by one or more clients of the media streaming system 100; as used herein, the terms "client computing device," "client device," and "client" may be used interchangeably. The client computing devices 170 may be coupled to portions of the media streaming system 100 via one or more networks, potentially including the Internet. A client may represent a customer (e.g., an individual or group) of the media streaming system 100. Typically, a user associated with one of the client computing devices 170 may have an account that has privileges to access media content provided by the media streaming system 100. The access may be fee-based or may instead be free to the user (potentially with advertisements in the streaming media or player software). However, some media may also be streamable to users without accounts or other arrangements, e.g., on websites that provide streaming video.

In one embodiment, the clients 170 may include computing devices or systems that perform additional processing on media streams. For example, downstream components represented by clients 170 may insert additional video content (e.g., advertisements) into portions of video streams referred to as breaks or avail breaks. Avail breaks may also be referred to as avails or availability windows. Breaks or avail breaks may represent portions or segments of a video in which a downstream component or other entity (e.g., local broadcasters) may insert additional video content, such as advertisements. Avail breaks may also represent the start or end of one program within a stream (program starts and stops), the start or end of a stream itself (network ends), program blackouts, placement opportunities, and other suitable disruptions or discontinuities in media content. Using the same avail break in the same video stream, different clients 170 or other components of the system 100 may customize the video stream my inserting different (and potentially client-specific) video content, audio content, and/or still images into the avail break. For example, market-specific advertisements may be inserted into the same avail break in the same video stream in different geographical regions. Similarly, viewer-specific advertisements may be inserted into the same avail break in the same video stream for different viewers, e.g., based on demographic information associated with those viewers.

It is contemplated that the media delivery pipeline implemented by the media streaming system 100 may include various combinations of stages, including the particular combination illustrated in FIG. 1 for purposes of example. In one embodiment, as shown in FIG. 1, the stages of the pipeline may include an acquisition stage 120, an encoding stage 130, and a packaging stage 140. At the acquisition stage 120, a signal representing the media may be acquired from one or more content providers 110, e.g., broadcasters. The signal may be acquired by the media streaming system 100 using any of several suitable transport mechanisms, including a serial digital interface (SDI), a camera feed, a microphone feed, an internet protocol (IP) connection, an asynchronous serial interface (ASI) connection, and so on. At the encoding stage 130, the media may be transformed into a particular video or audio format, e.g., using a particular codec. The encoding stage may be implemented by a plurality of components, referred to herein as encoders, that may operate in parallel. The encoders may differ in terms of the encoding tasks they perform. The encoding stage 130 may include compression, or a separate compression stage may be used in the pipeline. Additionally, at the encoding stage 130, the media may be divided into segments or chunks of a fixed or variable size. For example, the media may be divided into segments of approximately ten seconds in length for delivery via HTTP over TCP/IP.

In one embodiment, one or more components in the encoding stage 130 (e.g., one or more encoders operating in parallel) may implement a functionality for output-aligned avail blanking 131. The output-aligned avail blanking 131 may include a functionality for frame-rate conversion 132. The frame-rate conversion 132 may take a video input having a particular frame rate and generate one or more video outputs that generally include the same video content but differ in frame rate from the input and potentially from each other. For example, the frame-rate conversion 132 may convert a video input at 24 fps into multiple video outputs at 30 fps, 60 fps, 120 fps, and so on. In many cases, the frame rate of an output may not be an integer multiple (i.e., the product of the input frame rate and an integer) of the frame rate of the input, and so only some frames—but not all—of the input may be duplicated in the output, or some frames may be duplicated more than other frames.

The output-aligned avail blanking 131 may include a functionality for avail blanking 134 (also referred to as blanking) to create breaks such as avail breaks in video streams. To create an avail break using the output-aligned avail blanking 131, a sequence of frames may be blanked, blacked out, or replaced with a pre-configured slate image, and also signals may be associated with the first frame and last frame of the break to indicate the boundaries of the break to downstream components such as clients 170. The signals indicating the boundaries of the break may include embedded messages compliant with SCTE-35 (ANSI/SCTE 35 2013, a joint ANSI/Society of Cable and Telecommunications Engineers standard), out-of-band signals to be packaged with the video stream, instantaneous decoder refresh (IDR) frames, encoder boundary points, and/or other suitable indicators. As received by the encoding stage 130, the avail break may be associated with a starting time and a duration or an ending time. The starting time and ending time may be indicated using any suitable embedded signals or out-of-band signals with respect to the video stream, e.g., using presentation timestamp (PTS) metadata, timecodes, UTC times, and so on. The starting time may indicate a time and not a frame number and may occur on a frame boundary or not on a frame boundary (e.g., somewhere in the middle of a frame). The output-aligned avail blanking 131 may insert the beginning of the avail break using a first blanked frame at or near the associated starting time. Avail blanking may also include muting any audio and/or captioning during the avail break.

Using prior approaches, frame-rate conversion has been performed after the insertion of avail breaks. As discussed above, the frame rate of an output may not be an integer multiple (i.e., the product of the input frame rate and an integer) of the frame rate of the input, and so only some frames—but not all—of the input may be duplicated in the output, or some frames may be duplicated more than other frames. However, when frame-rate conversion is performed after insertion of the avail break, the resulting output may have a misalignment between the first blanked frame and the corresponding signal, such that the signal may be incorrectly associated with a different frame than the first blanked frame. When additional video content is inserted by a downstream component based on the presence of the signal, a blanked gap may appear or some of the original video may be overwritten if the signal and the first frame of the avail break are not properly aligned to the same frame. Similarly, using the prior approach, a blanked gap may appear or some of the original video may be overwritten if the appropriate signal and the last frame of the avail break are not properly aligned to the same frame To mitigate or eliminate this potential alignment problem, frame-rate conversion 132 may be performed before avail blanking 134 instead of after the avail blanking. After the frame-rate conversion 132 is performed, the starting frame selection 133 may be used to select the nearest frame to the starting time of the avail break in the video output with the converted frame rate. In one embodiment, the starting frame selection 133 may modify the starting time of the avail break by rounding it to the nearest frame boundary. The signal indicating the start of the avail break may then be assigned to or associated with this starting frame. In this manner, a signal indicating the start of an avail break may reliably be aligned to the first frame of the avail break (with no intermediate frames between the first frame and the signal). Using a similar technique, after the frame-rate conversion 132 is performed, the nearest frame to the ending time of the avail break in the video output may be selected with the converted frame rate. In one embodiment, the ending time of the avail break may be modified by rounding it to the nearest frame boundary. The signal indicating the end of the avail break may then be assigned to or associated with the final blanked frame.

Additionally, frame-rate conversion performed after insertion of the avail break may cause avail breaks to begin at different times in video outputs having different frame rates. As discussed above, the starting time may indicate a time and not a frame number and may occur on a frame boundary or in the middle of a frame. Using the prior approach, if frame-rate conversion generates a 30 fps output and a 60 fps output based on a 24 fps input, then the starting time of the avail break may map to a frame occurring at a different time in the 30 fps output than in the 60 fps output. If the same content is inserted into the avail break in those two outputs, a user who switches between the outputs may observe that the content is not synchronized.

To mitigate this synchronization problem, the output-aligned avail blanking 131 may also include a functionality for starting frame selection 133 for use with the avail blanking 134. For multiple video outputs having different frame rates, the starting frame selection 133 may select a starting frame for the avail break from the video output having the lowest frame rate so that the start of the avail break may be synchronized across the video outputs. The starting frame selection 133 may select, in the video output having the lowest frame rate, the nearest frame to the starting time of the avail break. In doing so, the starting frame selection 133 may modify the starting time of the avail break by rounding it to the nearest frame boundary. The avail break may begin at that frame and at corresponding frames occurring at the same time in the other video outputs. Similarly, output-aligned avail blanking 131 may select, in the video output having the lowest frame rate, the nearest frame to the ending time of the avail break, potentially modifying the ending time of the avail break by rounding it to the nearest frame boundary. The avail break may end at that frame and at corresponding frames occurring at the same time in the other video outputs. Such a technique may typically be used for video outputs whose frame rates are integer multiples of the lowest frame rate. For a video output with an incompatible (non-integer multiple) frame rate, a best effort may be used to select a starting frame for the avail break. The output-aligned avail blanking 131 may also include one or more additional encoding steps 135. Using the output-aligned avail blanking 131 at the encoding stage 130, avail breaks may thus be aligned properly within individual video streams and/or synchronized across multiple video streams to prevent undesired errors when additional content is inserted downstream.

Downstream from the encoding stage 130, the video outputs with aligned and/or synchronized avail breaks may be processed further and distributed to one or more clients 170. At the packaging stage 140, the media may be packaged and multiplexed (or "muxed") for playback on particular playback software (referred to herein as a "player") and/or a particular type of client device (e.g., a particular category of smartphone). In one embodiment, additional stages or sub-stages of the pipeline may perform additional transformations of the media, such as encryption performed at an encryption stage, decoding performed at a decoding stage, scaling performed at a scaling stage, advertisement insertion performed at an advertisement insertion stage (e.g., using the output-aligned and/or synchronized avail breaks), and/or other types of image processing (e.g., color transformation) performed at an image processing stage. Alternatively, one of the additional transformations may be performed as a sub-stage of another stage such as the encoding stage 130.

In one embodiment, as shown in FIG. 1, the stages may include an origin server stage (also referred to as an origin stage) 150 and a content delivery network (CDN) stage 160. The pipeline may include one or more origin servers and a larger number of CDN servers. The origin server(s) may act as distribution points to the CDN servers. The CDN servers may be located closer to clients in terms of geography and/or network latency in order to provide efficient distribution of the media. A single origin server may provide a media stream to many CDN servers, and each CDN server may then respond to requests for media from many client devices. In some cases, such as for prerecorded media, the origin server may persistently store the media (or segments thereof) for an indefinite period of time, while the CDN servers may cache segments of the media for a more limited period of time. If a client requests particular content that is not available in the cache at a CDN server, then the CDN server may request the content from the origin server and then deliver the content to the requesting client. At the origin server stage 150, the media may be sent from the origin server to one or more CDN servers. If other stages such as the acquisition stage 120, encoding stage 130, and/or packaging stage 140 are performed at the origin server, then the origin stage 150 may include those stages or include corresponding sub-stages. However, it is also contemplated that the origin server stage 150 may represent a distinct stage relative to the acquisition stage 120, encoding stage 130, and/or packaging stage 140. At the CDN stage 160, the media may be sent from a CDN server to a client device 170, e.g., as requested by the client device. In one embodiment, the stages may also include a playback stage that represents attempted playback by a player (e.g., implemented in player software) on a client device 170. As discussed above, the stages may further include a stage in which additional content is inserted into an avail break or an avail break is interpreted to separate one program from another within a video stream.

In some embodiments, components of the media streaming system 100 such as servers, storage resources, and network resources may be implemented using resources of a provider network. The provider network may be set up by an entity such as a company or a public sector organization to provide one or more services (such as various types of cloud-based computing or storage) accessible via the Internet and/or other networks to clients. The provider network may include numerous data centers hosting various resource pools, such as collections of physical and/or virtualized computer servers, storage devices, networking equipment and the like (e.g., implemented using the example computing system 3000 described below with regard to FIG. 8), needed to implement and distribute the infrastructure and services offered by the provider network. In some embodiments, the provider network may provide computing resources and services, such as services associated with the media streaming system 100; storage services, such as a block-based storage service, key-value based data stores, or various types of database systems; and/or any other type of network-based services. Clients may access these various services offered by provider network 100 via one or more networks, potentially including the Internet. Likewise, network-based services may themselves communicate and/or make use of one another to provide different services. For example, computing resources offered in units called "instances," such as virtual or physical compute instances or storage instances, may make use of particular data volumes, providing virtual block storage for the compute instances.

The provider network may implement or provide a multi-tenant environment such that multiple clients (e.g., content providers 110 and/or clients 170) may access or use a particular resource or service in a substantially simultaneous manner. Functionality of all or part of the media streaming system 100, such as the output-aligned avail blanking 131, may be offered to multiple clients (in a substantially simultaneous manner) in such a multi-tenant provider network, such that the same computational and storage resources associated with the media streaming system may be used on behalf of different clients over the same window of time. The different clients may represent different individuals and/or different organizations that may pay the provider network for access to one or more services and/or resources. The provider network may include a fleet of computing devices, also referred to herein as servers, hosts, or instances, which are configured to execute software on behalf of clients of the provider network. In one embodiment, a fleet of servers may grow or shrink as individual servers are provisioned or deprovisioned using resources of the provider network. In one embodiment, the fleet of servers may grow or shrink as individual servers are added to or removed from a dedicated fleet by an administrator.

The content providers 110 may be individuals or entities who provide streaming media content to the media streaming system 100 for potential delivery to the clients 170. The content providers 110 as illustrated in FIG. 1 may correspond to computing devices that are connected to the media streaming system 100 over one or more networks, potentially including the Internet. The computing devices associated with the content providers 110 may encompass any type of hardware and software that are configurable to submit requests to the media streaming system 100 (e.g., implemented using the example computing system 3000 described below with regard to FIG. 8). Similarly, the computing devices associated with the clients 170 may encompass any type of hardware and software that are configurable to consume streaming media provided by the media streaming system 100 (e.g., implemented using the example computing system 3000 described below with regard to FIG. 8). For example, a client computing device may include a dedicated media player, a suitable version of a web browser, and/or a plug-in module or other type of code module configured to execute as an extension to or within an execution environment provided by a web browser or other form of client software. In some embodiments, such a client application may include sufficient protocol support (e.g., for a suitable version of Hypertext Transfer Protocol [HTTP]) for generating and processing network-based service requests.

Content providers 110 and/or client computing devices 170 may convey network-based requests to the media streaming system 100 via one or more external networks. In various embodiments, the external network(s) may encompass any suitable combination of networking hardware and protocols necessary to establish network-based communications between computing devices and the media streaming system 100. For example, the network(s) may generally encompass the various telecommunications networks and service providers that collectively implement the Internet. The network(s) may also include private networks such as local area networks (LANs) or wide area networks (WANs) as well as public or private wireless networks. For example, both a given computing device and the media streaming system 100 may be respectively provisioned within enterprises having their own internal networks. In such an embodiment, the network(s) may include the hardware (e.g., modems, routers, switches, load balancers, proxy servers, etc.) and software (e.g., protocol stacks, accounting software, firewall/security software, etc.) necessary to establish a networking link between the given computing device and the Internet as well as between the Internet and the media streaming system 100. It is noted that in some embodiments, computing devices for content providers 110 and/or clients 170 may communicate with the media streaming system 100 using a private network in addition to or instead of the public Internet.

Figure 8:
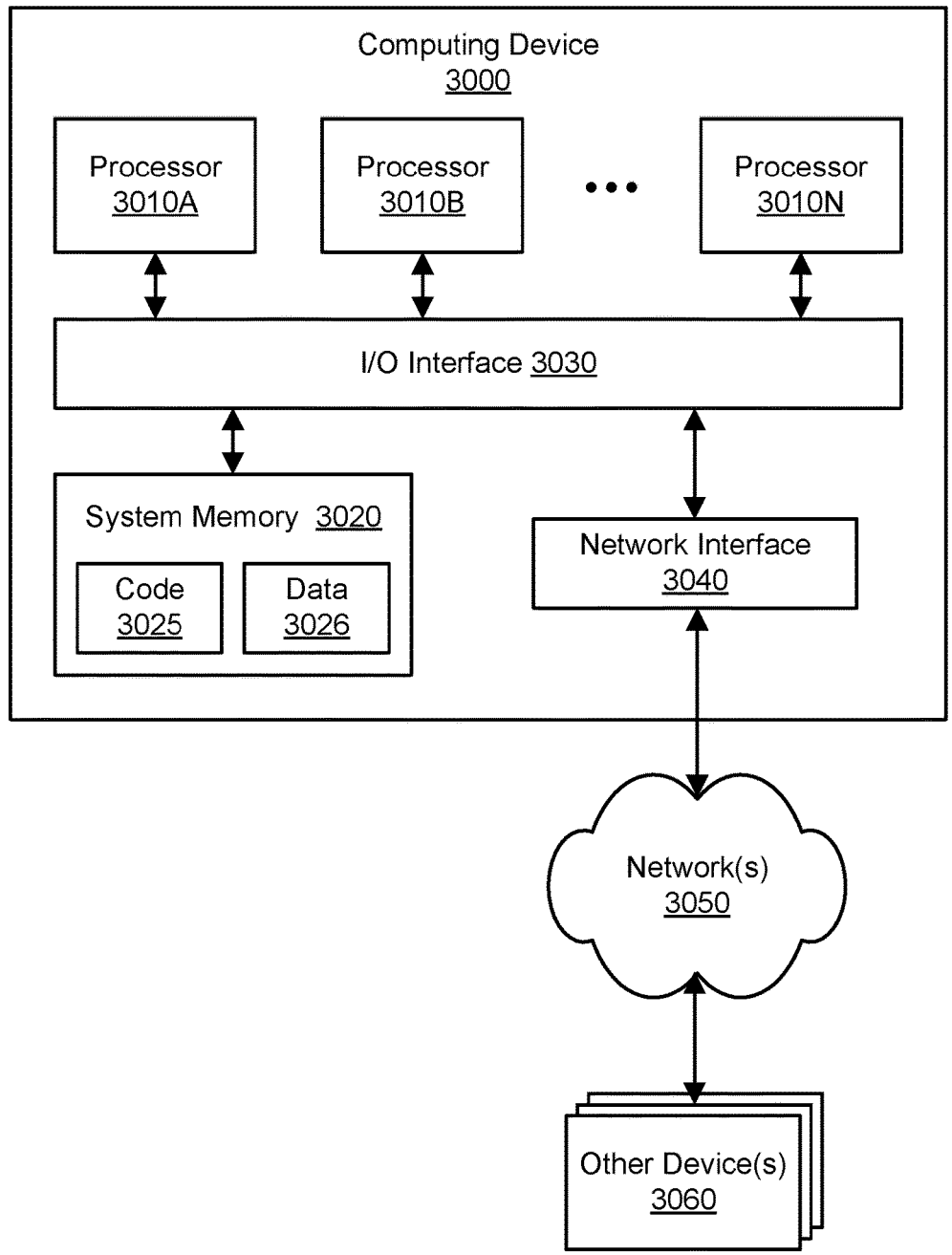
FIG. 8 illustrates an example computing device that may be used in some embodiments.

The media streaming system 100 may include a plurality of computing devices, any of which may be implemented by the example computing device 3000 illustrated in FIG. 8. In various embodiments, portions of the described functionality of the media streaming system 100 may be provided by the same computing device or by any suitable number of different computing devices. If any of the components of the media streaming system 100 are implemented using different computing devices, then the components and their respective computing devices may be communicatively coupled, e.g., via a network. Each of the illustrated components (such as the various stages 120, 130, 140, 150, and 160) may represent any combination of software and hardware usable to perform their respective functions. Multiple computing devices may typically be used to implement the multi-stage pipeline. In some circumstances, more than one stage may be performed by the same computing device.

It is contemplated that the media streaming system 100 may include additional components not shown, fewer components than shown, or different combinations, configurations, or quantities of the components shown. For example, although various stages such as stages 120, 130, 140, 150, and 160 are shown for purposes of example and illustration, it is contemplated that different quantities and configurations of stages may be used. Additionally, it is contemplated that some of the stages 120, 130, 140, 150, and 160 may include redundant components that collectively provide the functionality of the particular stage. Aspects of the functionality described herein may be performed, at least in part, by components outside of the media streaming system 100.

Figure 2:
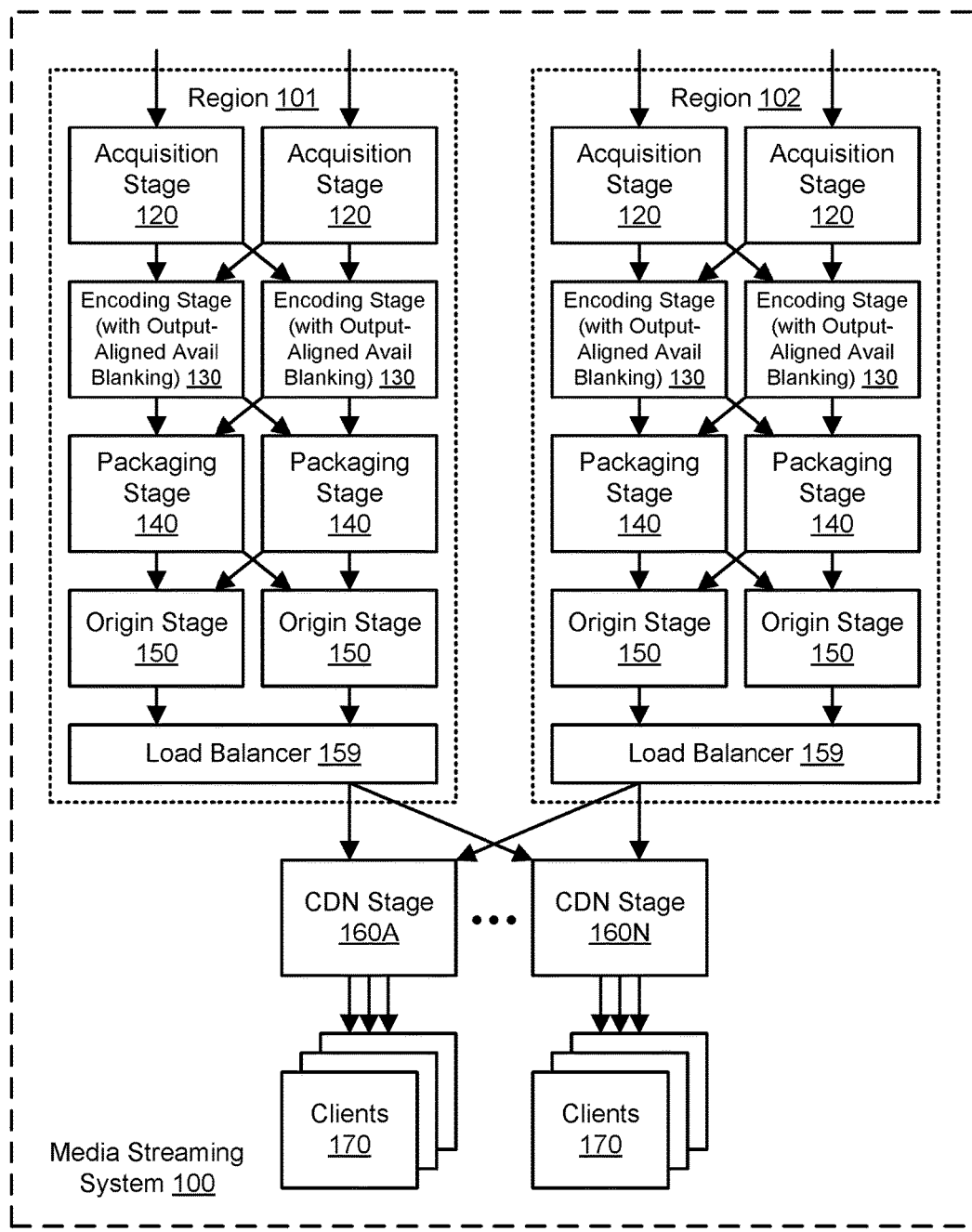
FIG. 2 illustrates further aspects of the example system environment for output-aligned avail blanking for video streams, including redundant pipeline components in multiple regions, according to one embodiment.

FIG. 2 illustrates further aspects of the example system environment for output-aligned avail blanking for video streams, including redundant components of stages, according to one embodiment. As discussed above, at least some of the stages 120, 130, 140, 150, and 160 may include redundant components (also referred to herein as instances) that collectively provide the functionality of the particular stage. The redundancy of components in the same stage may permit the pipeline to be rerouted to bypass a problematic component in that stage. As shown in the example of FIG. 2, the media streaming system 100 may be divided into multiple regions such as region 101 and region 102. The different regions 101 and 102 may represent different zones within a provider network whose resources are used to implement the media streaming system 100. The different regions 101 and 102 may represent geographical divisions of underlying components, including different nations, states, political subdivisions, continents, arbitrary zones, or data centers. Each of the regions 101 and 102 may implement a media delivery pipeline with multiple stages. Within each region, a particular stage may be implemented with redundancy. For example, multiple components operating in parallel may implement the acquisition stage 120, the encoding stage (including output-aligned avail blanking) 130, the packaging stage 140, and the origin stage 150 within each region. As illustrated in FIG. 2, the redundant components within a stage in a particular zone may also implement redundancy with respect to the connections to components in the previous stage and/or in the next stage. Each of the regions 101 and 102 may also include a load balancer fleet 159. The load balancers 159 may efficiently distribute requests between the origin state 150 and the CDN stage, as represented by CDN components 160A-160N. The CDN stage 160A-160N may respond to requests for streaming media from clients 170. As discussed above, the media streaming system 100 may typically have many clients 170 per CDN server and many CDN servers per origin server.

Figure 3:
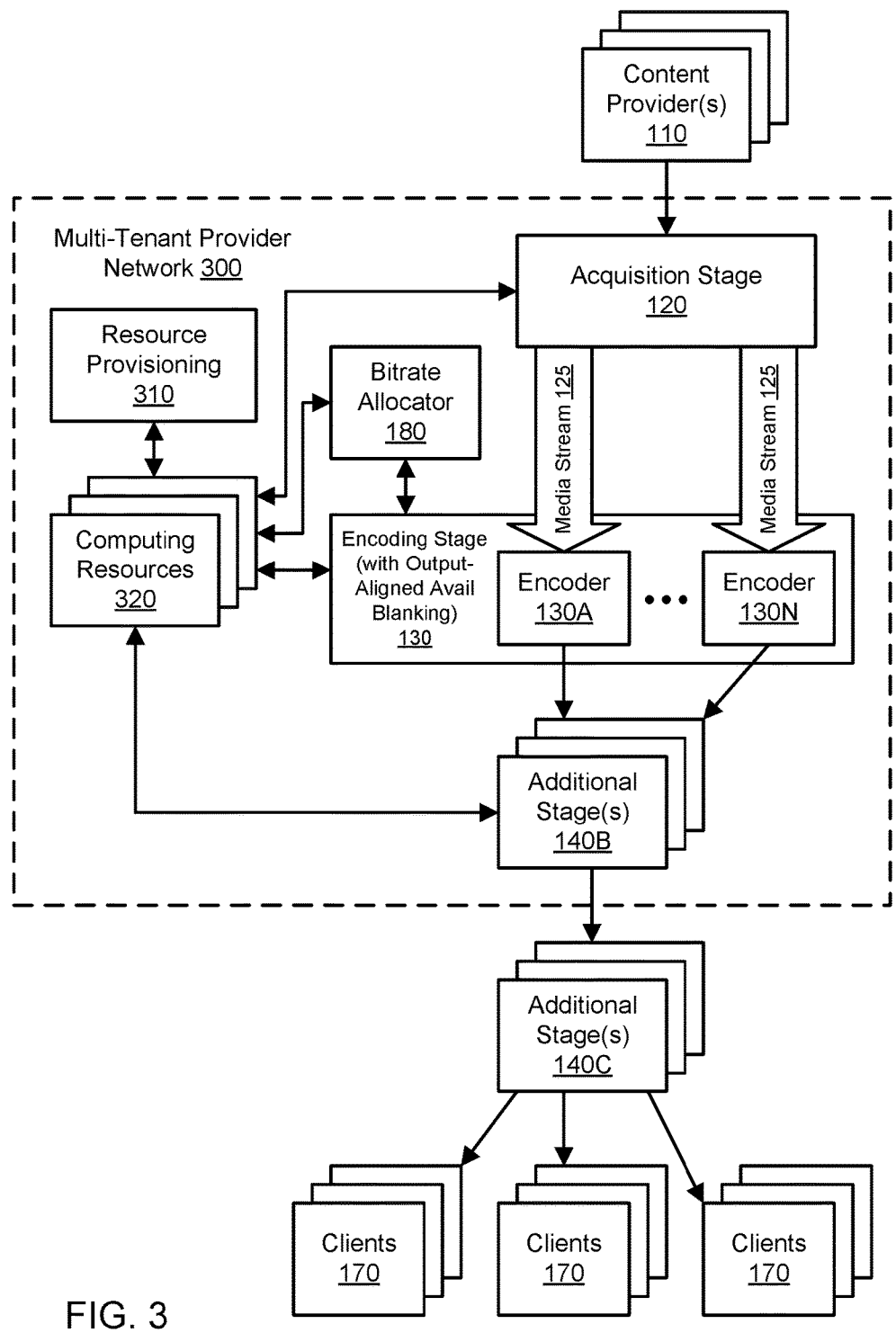
FIG. 3 illustrates further aspects of the example system environment for output-aligned avail blanking for video streams, including the implementation of components using computing resources provisioned from a multi-tenant provider network, according to one embodiment.

FIG. 3 illustrates further aspects of the example system environment for output-aligned avail blanking for video streams, including the implementation of components using computing resources provisioned from a multi-tenant provider network, according to one embodiment. As discussed above with respect to FIG. 1, the media streaming system 100 may be implemented using one or more computing resources, such as virtual compute instances or physical compute instances, that are provisioned from a provider network 300. In one embodiment, different components (including redundant components within a stage) of the media streaming system 100 may be implemented using different compute instances. The provider network 300 may offer multi-tenancy such that computing resources from a pool 320 may be shared by multiple clients of the provider network at any given time.

The computing resources 320 may include compute instances, storage instances, database instances, and so on. A resource provisioning functionality 310 in the multi-tenant provider network 300 may provision and deprovision resources in the pool 320 on behalf of clients. A computing resource from the pool 320 may be provisioned by selecting any appropriate type of resource, making it available to a particular client at a particular time, and potentially configuring the resource (e.g., with operating system software for a compute instance) to meet the requirements of the client. The client may then operate the provisioned resource based on the client's agreement with the provider network, e.g., on an hourly basis for a fee. When a resource is deprovisioned and returned to the pool 320 of available resources, another client may then provision and use that resource.

Various components of the pipeline, such as encoders 130A-130N that process a media stream 125 using output-aligned avail blanking, may be provisioned using resources of the provider network. As shown in the example of FIG. 3, an acquisition stage 120 and one or more additional pipeline stages 140B may be implemented using the resources of the provider network 300, while one or more other pipeline stages 140C may be implemented outside of the provider network. For example, packagers in a packaging stage may be implemented inside the provider network 300, while origin servers and content delivery network (CDN) servers may be implemented outside the provider network.

Figure 4:
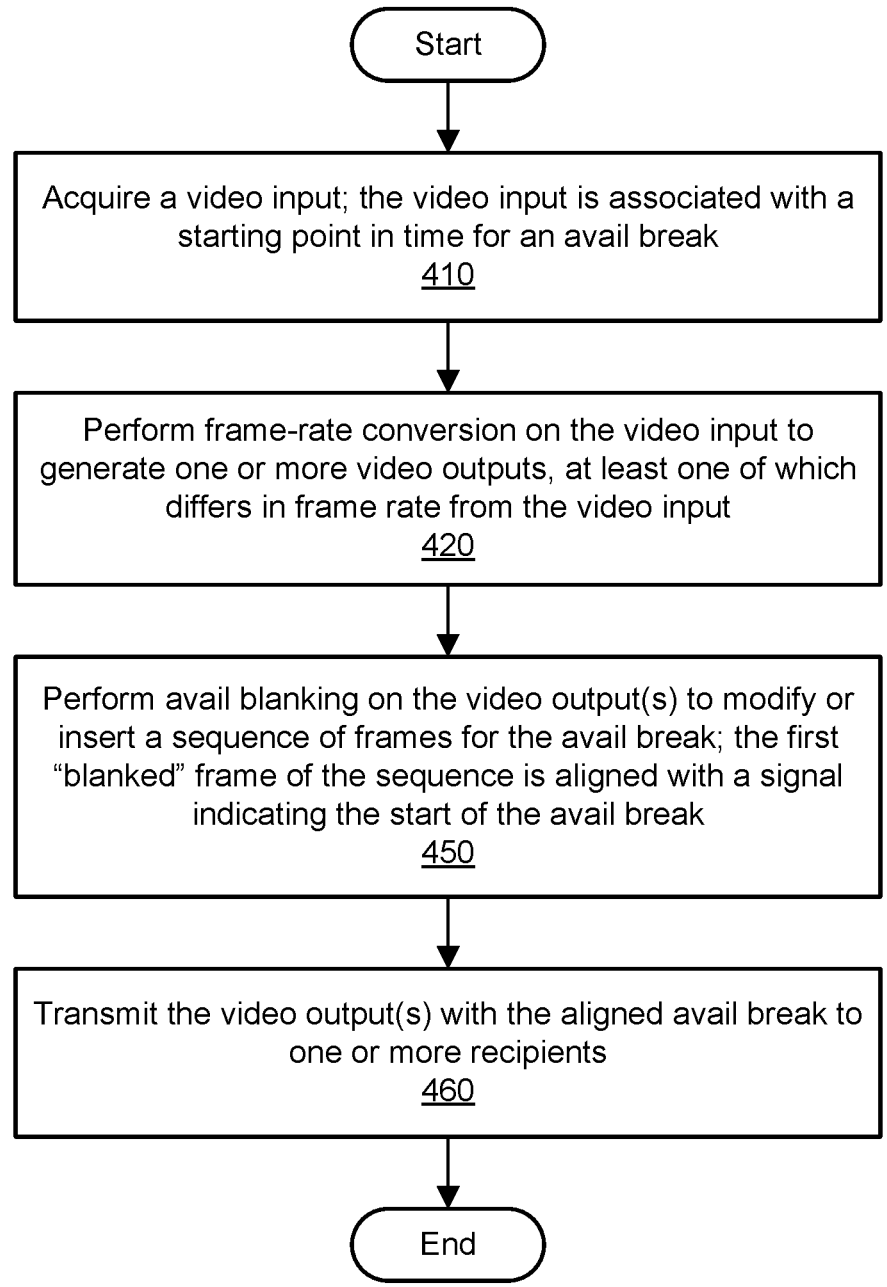
FIG. 4 is a flowchart illustrating a method for output-aligned avail blanking for video streams, according to one embodiment.

FIG. 4 is a flowchart illustrating a method for output-aligned avail blanking for video streams, according to one embodiment. As shown in 410, a video input may be acquired, e.g., by one or more components of a media streaming system from one or more content providers. A video input may include a package of digital media such as video, audio, video with audio, textual content (e.g., subtitles, closed captioning data, or annotations), and/or other metadata such as overhead data. The video component of the package may include a sequence of frames at a particular frame rate. The video input may be associated with a starting time and a duration or an ending time for a break such as an avail break. The starting time and ending time may be signaled as embedded signals or out-of-band signals with respect to the video stream. The starting time may indicate a time and not a frame number and may occur on a frame boundary or in the middle of a frame. Acquiring the video input may include acquiring current elements of a stream, such as one or more frames of digital media for any of one or more channels in the stream, during which the avail break is indicated by the start time.

As shown in 420, frame-rate conversion may be performed on the video input. The frame-rate conversion may generate one or more video outputs. The frame-rate conversion may take a video input having a particular frame rate and generate one or more video outputs that generally include the same video content but differ in frame rate from the input and potentially from each other. For example, the frame-rate conversion 132 may convert a video input at 24 fps into multiple video outputs at 30 fps, 60 fps, 120 fps, and so on. In many cases, the frame rate of an output may not be an integer multiple (i.e., the product of the input frame rate and an integer) of the frame rate of the input, and so only some frames—but not all—of the input may be duplicated in the output.

As shown in 450, a blanking operation such as avail blanking may be performed on the video output(s). After the frame-rate conversion has been performed, the nearest frame to the starting time of the avail break may be selected as the starting frame of the avail break in a video output. In one embodiment, the starting time of the avail break may be modified by rounding it to the nearest frame boundary. The avail blanking may modify a sequence of frames or insert a new sequence of frames representing an avail break. To create an avail break, a sequence of frames may be blanked, blacked out, or replaced with a pre-configured slate image. Additionally, signals may be associated with the first frame and last frame of the break to indicate the boundaries of the break. The signal indicating the start of the avail break may be assigned to or associated with the starting frame. In this manner, a signal indicating the start of an avail break may reliably be aligned to the first frame of the avail break (with no intermediate frames between the first frame and the signal). Similarly, a signal indicating the end of an avail break may reliably be aligned to the last frame of the avail break (with no intermediate frames between the last frame and the signal). The signals indicating the boundaries of the break may include embedded messages compliant with SCTE-35 (ANSI/SCTE 35 2013, a joint ANSI/Society of Cable and Telecommunications Engineers standard), out-of-band signals to be packaged with the video stream, instantaneous decoder refresh (IDR) frames, encoder boundary points, and/or other suitable indicators. Avail blanking may also include muting any audio and/or captioning during the avail window.

As shown in 460, the video output(s) with the aligned avail break may be transmitted to one or more recipients, e.g., as a stream of video using components of a media streaming system. Transmitting the video output(s) may include transmitting the current elements of the stream, such as a sequence of frames of digital media including a sequence of blanked frames in the avail break. The operations shown in 410, 420, 450, and 460 may be performed again for the same stream or for other streams, potentially in parallel.

Figure 5:
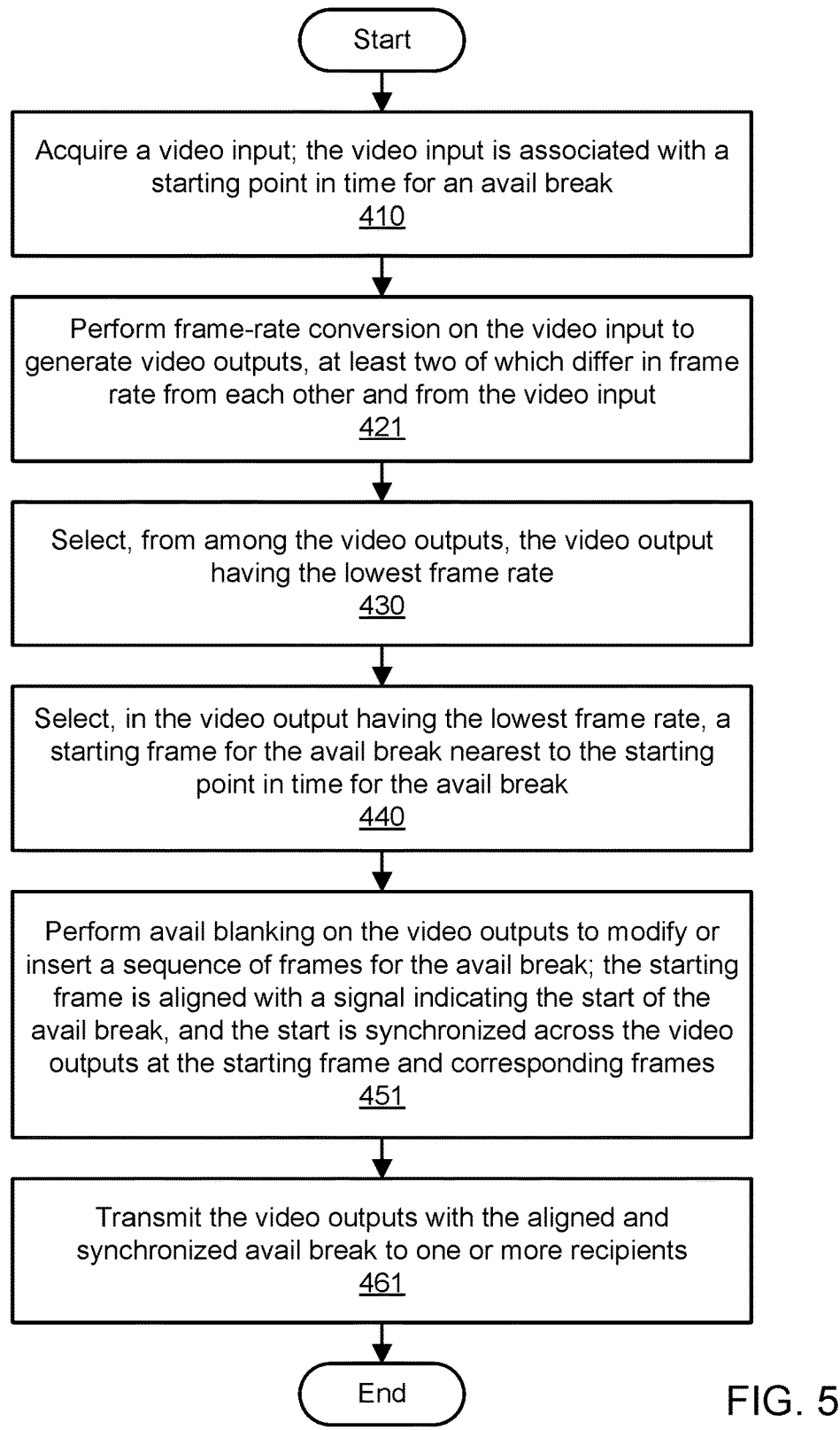
FIG. 5 is a flowchart illustrating further aspects of the method for output-aligned avail blanking for video streams, including selection of a starting frame for avail break synchronization, according to one embodiment.

FIG. 5 is a flowchart illustrating further aspects of the method for output-aligned avail blanking for video streams, including selection of a starting frame for avail break synchronization, according to one embodiment. As shown in 410, a video input may be acquired, e.g., by one or more components of a media streaming system from one or more content providers. A video input may include a package of digital media such as video, audio, video with audio, textual content (e.g., subtitles, closed captioning data, or annotations), and/or other metadata such as overhead data. The video component of the package may include a sequence of frames at a particular frame rate. The video input may be associated with a starting time and a duration or an ending time for an avail break. The starting time and ending time may be signaled as embedded signals or out-of-band signals with respect to the video stream. The starting time may indicate a time and not a frame number and may occur on a frame boundary or in the middle of a frame. Acquiring the video input may include acquiring current elements of a stream, such as one or more frames of digital media for any of one or more channels in the stream, during which the avail break is indicated by the start time.

As shown in 421, frame-rate conversion may be performed on the video input. The frame-rate conversion may generate multiple video outputs. The frame-rate conversion may take a video input having a particular frame rate and generate video outputs that generally include the same video content but differ in frame rate from the input and often from each other. For example, the frame-rate conversion 132 may convert a video input at 24 fps into multiple video outputs at 30 fps, 60 fps, 120 fps, and so on. In many cases, the frame rate of an output may not be an integer multiple (i.e., the product of the input frame rate and an integer) of the frame rate of the input, and so only some frames—but not all—of the input may be duplicated in the output.

As shown in 430, the video output having the lowest frame rate may be selected from among the video outputs. For example, if the frame-rate conversion 132 generated video outputs at 30 fps, 60 fps, and 120 fps, then the video output at 30 fps may be selected as the output with the lowest frame rate. As shown in 440, a starting frame for the avail break may be selected in the video output having the lowest frame rate. The starting frame may be the nearest frame to the starting point in time for the avail break. In one embodiment, the starting time of the avail break may be modified by rounding it to the nearest frame boundary. If the frame rates of other video outputs are integer multiples of the lowest frame rate, then those other video outputs may have corresponding starting frames that begin at the same time as the starting frame selected in the video output with the lowest frame rate. In one embodiment, the ending frame of the avail break may also be selected in the video output having the lowest frame rate, either using the duration of the avail break or a specific ending time of the avail break, and potentially modifying the ending time by rounding it to the nearest frame boundary. If the frame rates of other video outputs are integer multiples of the lowest frame rate, then those other video outputs may have corresponding ending frames that occur at the same time as the ending frame selected in the video output with the lowest frame rate.

As shown in 451, avail blanking may be performed on the video outputs. The avail blanking may modify a sequence of frames or insert a new sequence of frames representing an avail break. To create an avail break, a sequence of frames may be blanked, blacked out, or replaced with a pre-configured slate image. Additionally, signals may be associated with the first frame and last frame of the break to indicate the boundaries of the break. The signal indicating the start of the avail break may be assigned to or associated with the starting frame. In this manner, a signal indicating the start of an avail break may reliably be aligned to the first frame of the avail break (with no intermediate frames between the first frame and the signal). Similarly, a signal indicating the end of an avail break may reliably be aligned to the last frame of the avail break (with no intermediate frames between the last frame and the signal). The signals indicating the boundaries of the break may include embedded messages compliant with SCTE-35 (ANSI/SCTE 35 2013, a joint ANSI/Society of Cable and Telecommunications Engineers standard), out-of-band signals to be packaged with the video stream, instantaneous decoder refresh (IDR) frames, encoder boundary points, and/or other suitable indicators. Avail blanking may also include muting any audio and/or captioning during the avail window.

Across the multiple video outputs, the avail break may begin at the selected starting frame in the output with the lowest frame rate and at corresponding frames occurring at the same time in the other video outputs. Additionally, the avail break may end at a selected ending frame in the output with the lowest frame rate and at corresponding frames occurring at the same time in the other video outputs. Such a technique may typically be used for video outputs whose frame rates are integer multiples of the lowest frame rate. For a video output with an incompatible (non-integer multiple) frame rate, a best effort may be used to select a starting frame and/or ending frame for the avail break. In this manner, the avail break may be synchronized across multiple video outputs such that the break starts at the same time in the outputs (e.g., in the output with the lowest frame rate along with the outputs whose frame rates are integer multiples of the lowest frame rate). The avail break may also have the same duration in time in the multiple video outputs and may thus end at the same time across the multiple video outputs.

As shown in 461, one or more of the video outputs with the aligned and synchronized avail break may be transmitted to one or more recipients, e.g., as one or more streams of video using components of a media streaming system. Multiple ones of the video outputs may be packaged together and transmitted in the same multiple-program transport stream (MPTS) or separately in individual transport streams. Transmitting the video output(s) may include transmitting the current elements of the video, such as a sequence of frames of digital media including a sequence of blanked frames in the avail break. The operations shown in 410, 421, 430, 440, 451, and 461 may be performed again for the same stream or for other streams, potentially in parallel.

In one embodiment, the selection of the lowest frame rate for avail break synchronization may be implemented according to the following pseudo-code, where frame rates are expressed as a ratio of frames per second, and where (avail_align_frame_rate.numerator/video_output.frame_rate.denominator) may be initialized to a sufficiently high value:

```
for each (video_output in all_video_outputs)
{
  if (video_output.frame_rate numerator && video_output.
      frame_rate_denominator)
  {
    if ((video_output.frame_rate.numerator/video_output.
        frame_rate.denominator)
        <
        (avail_align_frame_rate.numerator/video_output.
           frame_rate.denominator))
    {
      avail_align_frame_rate=video_output.frame_rate;
    }
  }
}
```

In one embodiment, the synchronization of avail breaks across multiple video outputs may be implemented according to the following pseudo-code:

```
avail_original=avail
avail.begin_time=RoundTimeToFrameBoundary
    (avail_original.begin_time, avail_align_frame_rate);
if (avail.duration is not 0)
{
  avail_time_change=avail.begin_time−avail_original.
      begin_time;
  avail.duration=RoundTimeToFrameBoundary
      (avail_original.duration−avail_time_change, align_
      frame_rate);
}
RoundTimeToFrameBoundary(time, align_frame_rate)
{
  frames=round_to_nearest_int((time+((1/align_fram-
      e_rate)/2))*align_frame_rate)
  time=frames/align_frame_rate
  return time
}
```

Figure 6A:
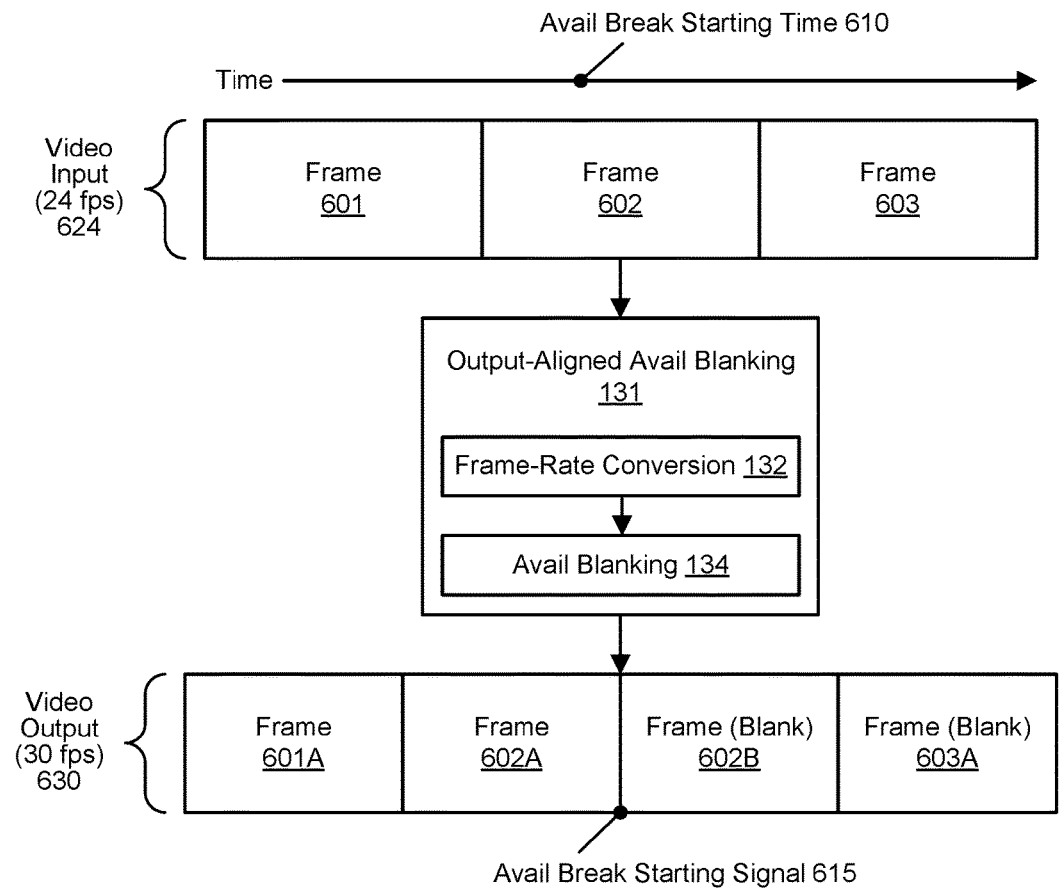
FIG. 6A illustrates an example of an aligned avail break generated using the output-aligned avail blanking for video streams, according to one embodiment.

FIG. 6A illustrates an example of an aligned avail break generated using the output-aligned avail blanking for video streams, according to one embodiment. As shown in the example of FIG. 6A, the output-aligned avail blanking 131 may take a video input 624 at 24 fps and generate a video output 630 at 30 fps. The input video 624 may include a sequence of frames including frames 601, 602, and 603. Because 30 fps is not an integer multiple of 24 fps, the content of some frames of the input video 624 may be duplicated in the output video 630, such as frame 602 being duplicated in frame 602A and frame 602B. The output 630 may also include frame 601A that duplicates frame 601 of the input 624 and frame 603A that duplicates frame 603 of the input. The video input 624 may be associated with an avail break starting time 610. As shown in the example of FIG. 6A, the starting time 610 may not fall on a frame boundary but may instead occur inside frame 602 and also inside frame 602A. After frame-rate conversion 132 is performed, frame 602B may be selected as the starting frame of the avail break. Accordingly, frame 602B may be associated with an avail break starting signal 615. The signal indicating the boundaries of the break may include embedded messages compliant with SCTE-35 (ANSI/SCTE 35 2013, a joint ANSI/Society of Cable and Telecommunications Engineers standard), out-of-band signals to be packaged with the video stream, instantaneous decoder refresh (IDR) frames, and/or other suitable indicators. For example, frame 602B may be an IDR frame to indicate to downstream components that prior video elements should not be used in the rendering of this frame.

Using the avail blanking functionality 134, a sequence of frames in the 30 fps video output 630 may be blanked, blacked out, or be replaced with a pre-configured slate image; additionally, any audio or captioning may be muted. After the frame-rate conversion 132 is performed, the starting frame may be selected in the output video 630 as the nearest frame to the avail break starting time 610. In one embodiment, the starting the starting time 610 may effectively be modified by rounding it to the nearest frame boundary, e.g., the beginning of frame 602B. A signal 615 indicating the start of the avail break may then be assigned to or associated with this starting frame 602B. The starting frame 602B that is associated with the signal 615 may also be the first blanked frame in the avail break, such that the actual beginning of the avail break is properly aligned with the signal. Using a prior approach in which frame-rate conversion was performed after avail blanking, the resulting output could have had a misalignment between the first blanked frame and the signal, such that the signal could have been incorrectly associated with a different frame than the first blanked frame. By instead performing avail blanking only after frame-rate conversion has been performed, misalignment of the signal 615 and the first frame in the avail break may be avoided. In a similar manner, misalignment of a similar signal with the last frame in the avail break may be avoided.

Figure 6B:
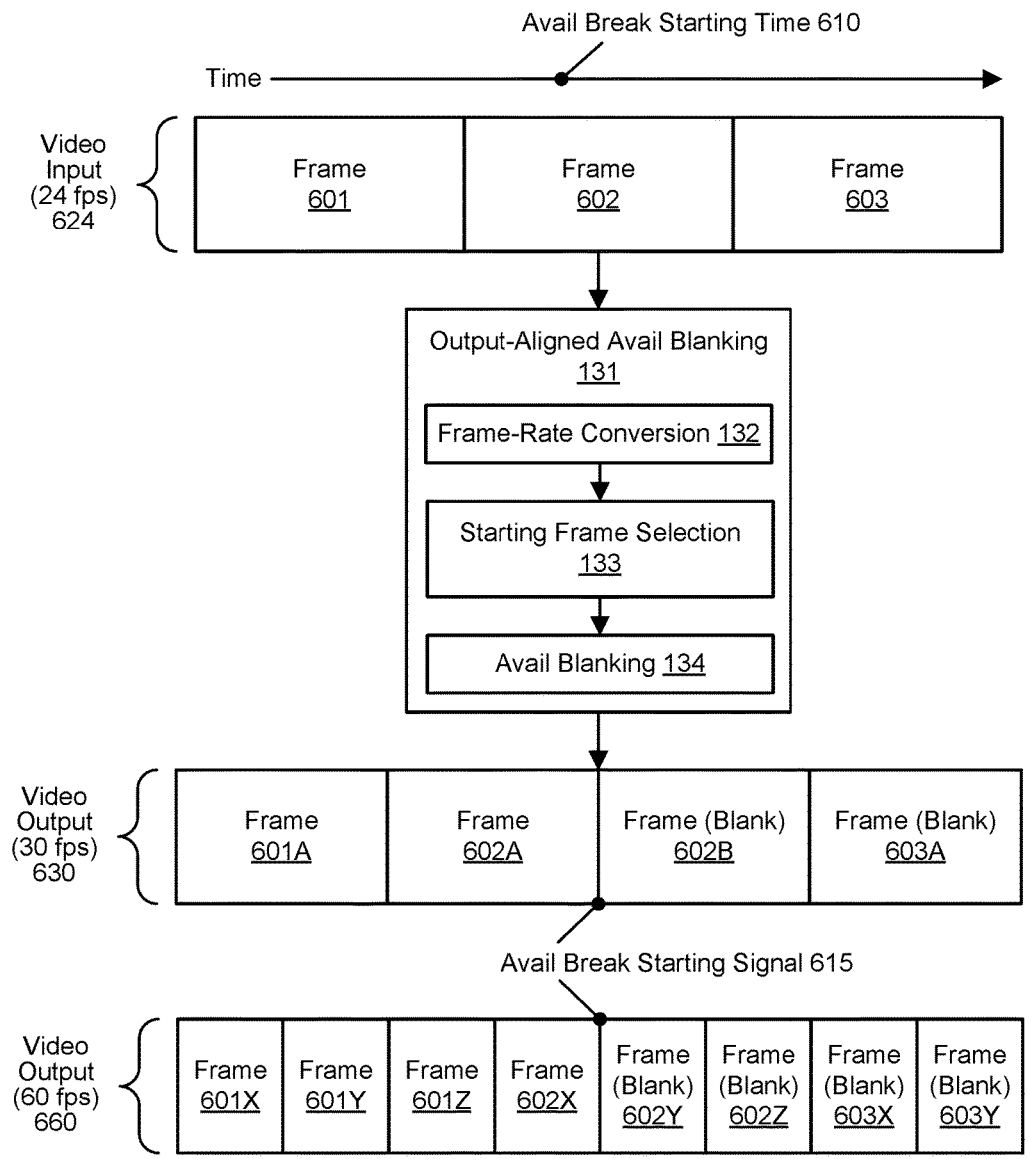
FIG. 6B illustrates an example of an aligned and synchronized avail break generated using the output-aligned avail blanking for video streams, according to one embodiment.

FIG. 6B illustrates an example of an aligned and synchronized avail break generated using the output-aligned avail blanking for video streams, according to one embodiment. As shown in the example of FIG. 6B, the output-aligned avail blanking 131 may take a video input 624 at 24 fps and generate one video output 630 at 30 fps and another video output 660 at 60 fps. The input video 624 may include a sequence of frames including frames 601, 602, and 603. Because 30 fps is not an integer multiple of 24 fps, the content of some frames of the input video 624 may be duplicated in the output video 630, such as frame 602 being duplicated in frame 602A and frame 602B. The output 630 may also include frame 601A that duplicates frame 601 of the input 624 and frame 603A that duplicates frame 603 of the input. Similarly, because 60 fps is not an integer multiple of 24 fps, the content of some frames of the input video 624 may be duplicated in the output video 660, such as frame 601 being duplicated in frames 601X, 601Y, and 601Z; frame 602 being duplicated in frames 602X, 602Y, and 602Z; and frame 603 being duplicated in frames 603X and 603Y. Again, the video input 624 may be associated with an avail break starting time 610. As shown in the example of FIG. 6B, the starting time 610 may not fall on a frame boundary but may instead occur inside frame 602 and also inside frame 602A and frame 603X.

For multiple video outputs 630 and 660 having different frame rates (30 fps and 60 fps, respectively), the starting frame selection 133 may select a starting frame for the avail break from the video output having the lowest frame rate so that the start of the avail break may be synchronized across the video outputs. Accordingly, in the example of FIG. 6B, the starting frame selection 133 may select a starting frame for the avail break from the 30 fps video output 630. The starting frame selection 133 may select, in the 30 fps video output 630, the nearest frame 602B to the starting time 610 of the avail break. In doing so, the starting frame selection 133 may effectively modify the starting time 610 of the avail break by rounding it to the nearest frame boundary. The avail break may begin at that frame 602B and at corresponding frames (such as frame 602Y in output 660) occurring at the same time in the other video outputs. Such a technique may typically be used for video outputs whose frame rates are integer multiples of the lowest frame rate, such as the 60 fps video output 660. For a video output with an incompatible (non-integer multiple) frame rate, a best effort may be used to select a starting frame for the avail break.

After frame 602B is selected as the starting frame of the avail break, frame 602B may be associated with an avail break starting signal 615. The signal indicating the boundaries of the break may include embedded messages compliant with SCTE-35 (ANSI/SCTE 35 2013, a joint ANSI/Society of Cable and Telecommunications Engineers standard), out-of-band signals to be packaged with the video stream, instantaneous decoder refresh (IDR) frames, and/or other suitable indicators. For example, frame 602B may be an IDR frame to indicate to downstream components that prior video elements should not be used in the rendering of this frame. Similarly, the corresponding starting frame 602Y in the video output 660 may be associated with the avail break starting signal 615, e.g., by making the frame 602Y an IDR frame as well.

Using the avail blanking functionality 134, a sequence of frames beginning with frame 602B in the 30 fps video output 630 may be blanked, blacked out, or be replaced with a pre-configured slate image; additionally, any audio or captioning may be muted. Similarly, a sequence of frames beginning with frame 602Y in the 60 fps video output 630 may be blanked, blacked out, or be replaced with a pre-configured slate image; additionally, any audio or captioning may be muted. The starting frame 602B that is associated with the signal 615 may be the first blanked frame in the avail break in the video output 630, such that the actual beginning of the avail break is properly aligned with the signal. Similarly, the starting frame 602Y that is associated with the signal 615 may be the first blanked frame in the avail break in the video output 660, such that the actual beginning of the avail break is properly aligned with the signal. Using a prior approach in which frame-rate conversion was performed after avail blanking, the resulting output could have had a misalignment between the first blanked frame and the signal, such that the signal could have been incorrectly associated with a different frame than the first blanked frame. By instead performing avail blanking only after frame-rate conversion has been performed, misalignment of the signal 615 and the first frame in the avail break may be avoided. Using the prior approach in which frame-rate conversion was performed after avail blanking, the starting time of the avail break could have mapped to a frame occurring at a different time in the 30 fps output than in the 60 fps output. By selecting the starting frame in the video output having the lowest frame rate and modifying the avail break start time to the opening of that frame, the beginning of the avail break may be synchronized to the same time in multiple video outputs such as outputs 630 and 660. In a similar manner, the ending time of the avail break may be synchronized to the same time in multiple video outputs such as outputs 630 and 660.

Figure 7A:
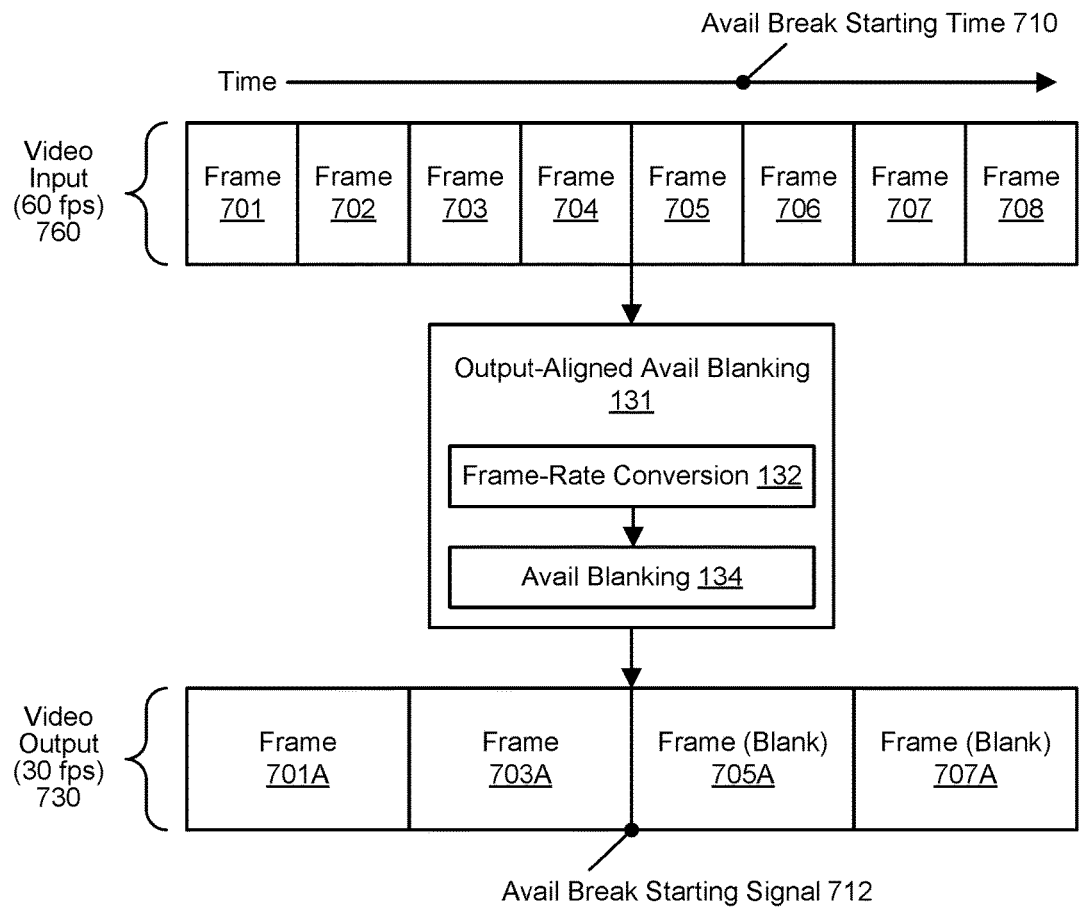
FIG. 7A illustrates an example of an aligned avail break generated using the output-aligned avail blanking for video streams, with frame-rate down-conversion, according to one embodiment.

FIG. 7A illustrates an example of an aligned avail break generated using the output-aligned avail blanking for video streams, with frame-rate down-conversion, according to one embodiment. As shown in the example of FIG. 7A, the output-aligned avail blanking 131 may take a video input 760 at 60 fps and generate a down-converted video output 730 at 30 fps. The input video 760 may include a sequence of frames including frames 701, 702, 703, 704, 705, 706, 707, and 708. Because the output 730 has half the frame rate of the input 760, the output may include every second frame from the input but with the frames having twice the duration, including frame 701A that duplicates frame 701 of the input, frame 703A that duplicates frame 703 of the input, frame 705A that duplicates frame 705 of the input, and frame 707A that duplicates frame 707 of the input. The video input 760 may be associated with an avail break starting time 710. As shown in the example of FIG. 7A, the starting time 710 may not fall on a frame boundary with respect to the output video 730. After frame-rate conversion 132 is performed, frame 705A may be selected as the starting frame of the avail break. Accordingly, frame 705A may be associated with an avail break starting signal 712. The signal indicating the boundaries of the break may include embedded messages compliant with SCTE-35 (ANSI/SCTE 35 2013, a joint ANSI/Society of Cable and Telecommunications Engineers standard), out-of-band signals to be packaged with the video stream, instantaneous decoder refresh (IDR) frames, and/or other suitable indicators. For example, frame 705A may be an IDR frame to indicate to downstream components that prior video elements should not be used in the rendering of this frame.

Using the avail blanking functionality 134, a sequence of frames in the 30 fps video output 730 may be blanked, blacked out, or be replaced with a pre-configured slate image; additionally, any audio or captioning may be muted. After the frame-rate conversion 132 is performed, the starting frame may be selected in the output video 730 as the nearest frame to the avail break starting time 710. In one embodiment, the starting the starting time 710 may effectively be modified by rounding it to the nearest frame boundary, e.g., the beginning of frame 705A. A signal 712 indicating the start of the avail break may then be assigned to or associated with this starting frame 705A. The starting frame 705A that is associated with the signal 712 may also be the first blanked frame in the avail break, such that the actual beginning of the avail break is properly aligned with the signal. Using a prior approach in which frame-rate conversion was performed after avail blanking, the resulting output could have had a misalignment between the first blanked frame and the signal, such that the signal could have been incorrectly associated with a different frame than the first blanked frame. By instead performing avail blanking only after frame-rate conversion has been performed, misalignment of the signal 712 and the first frame in the avail break may be avoided. In a similar manner, misalignment of a similar signal with the last frame in the avail break may be avoided.

Figure 7B:
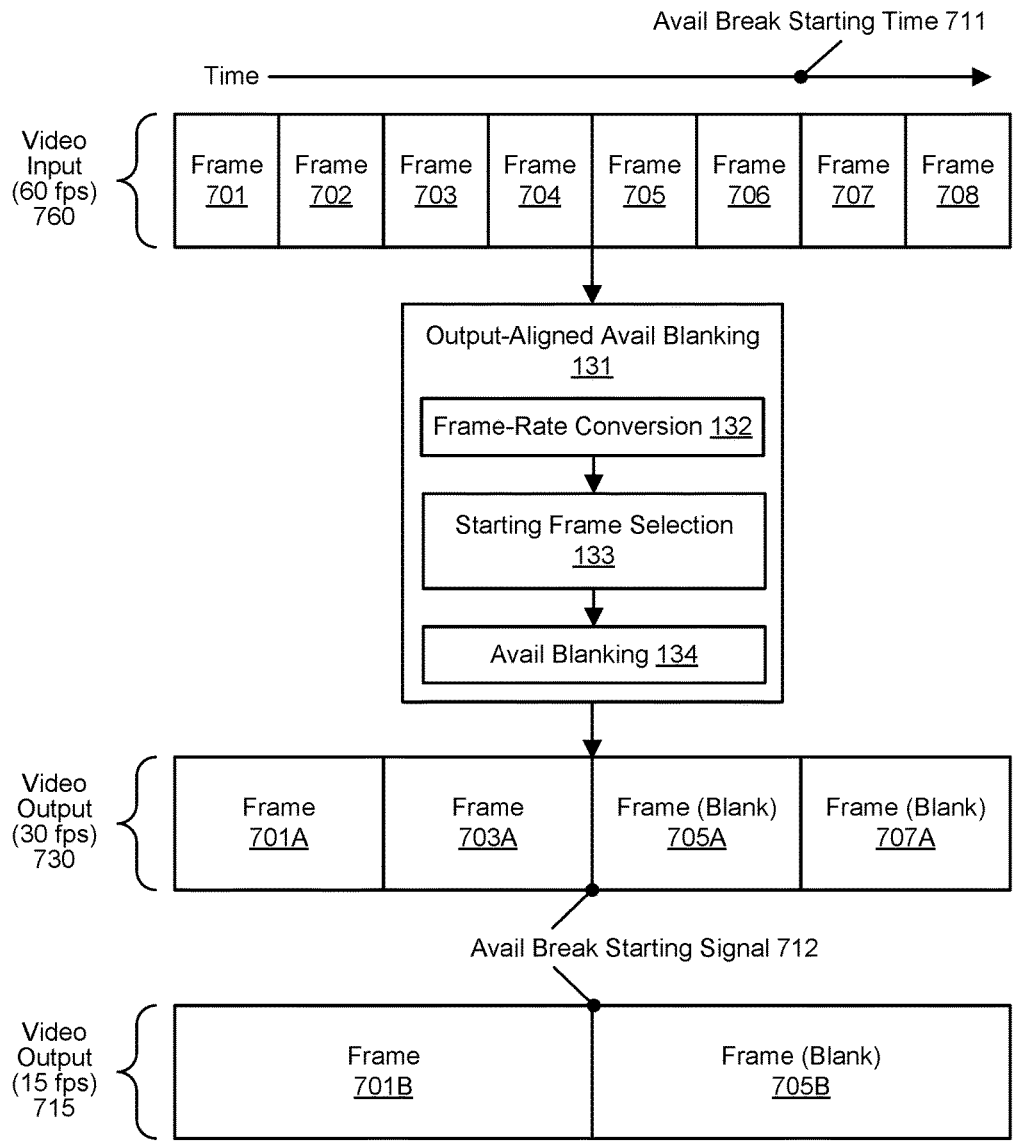
FIG. 7B illustrates an example of an aligned and synchronized avail break generated using the output-aligned avail blanking for video streams, with frame-rate down-conversion, according to one embodiment.

FIG. 7B illustrates an example of an aligned and synchronized avail break generated using the output-aligned avail blanking for video streams, with frame-rate downconversion, according to one embodiment. The output-aligned avail blanking 131 may take a video input 760 at 60 fps and generate one down-converted video output 730 at 30 fps and another down-converted video output 715 at 15 fps. The input video 760 may include a sequence of frames including frames 701, 702, 703, 704, 705, 706, 707, and 708. Because the output 730 has half the frame rate of the input 760, the output may include every second frame from the input but with the frames having twice the duration, including frame 701A that duplicates frame 701 of the input, frame 703A that duplicates frame 703 of the input, frame 705A that duplicates frame 705 of the input, and frame 707A that duplicates frame 707 of the input. Because the output 715 has one-fourth the frame rate of the input 760, the output may include every fourth frame from the input but with the frames having four times the duration, including frame 701B that duplicates frame 701 of the input and frame 705B that duplicates frame 705 of the input. The video input 760 may be associated with an avail break starting time 711. As shown in the example of FIG. 7A, the starting time 711 may not fall on a frame boundary with respect to one or more of the output videos, such as output video 715.

For multiple video outputs 730 and 715 having different frame rates (30 fps and 15 fps, respectively), the starting frame selection 133 may select a starting frame for the avail break from the video output having the lowest frame rate so that the start of the avail break may be synchronized across the video outputs. Accordingly, in the example of FIG. 7B, the starting frame selection 133 may select a starting frame for the avail break from the 15 fps video output 715. The starting frame selection 133 may select, in the 15 fps video output 715, the nearest frame 705B to the starting time 711 of the avail break. In doing so, the starting frame selection 133 may effectively modify the starting time 711 of the avail break by rounding it to the nearest frame boundary in the output having the lowest frame rate. The avail break may begin at that frame 705B and at corresponding frames (such as frame 705A in output 730) occurring at the same time in the other video outputs. Such a technique may typically be used for video outputs whose frame rates are integer multiples of the lowest frame rate. For a video output with an incompatible (non-integer multiple) frame rate, a best effort may be used to select a starting frame for the avail break.

After frame 705B is selected as the starting frame of the avail break, frame 705B may be associated with an avail break starting signal 712. The signal indicating the boundaries of the break may include embedded messages compliant with SCTE-35 (ANSI/SCTE 35 2013, a joint ANSI/Society of Cable and Telecommunications Engineers standard), out-of-band signals to be packaged with the video stream, instantaneous decoder refresh (IDR) frames, and/or other suitable indicators. For example, frame 705B may be an DR frame to indicate to downstream components that prior video elements should not be used in the rendering of this frame. Similarly, the corresponding starting frame 705A in the video output 730 may be associated with the avail break starting signal 712, e.g., by making the frame 705A an IDR frame as well.

Using the avail blanking functionality 134, a sequence of frames beginning with frame 705B in the 15 fps video output 715 may be blanked, blacked out, or be replaced with a pre-configured slate image; additionally, any audio or captioning may be muted. Similarly, a sequence of frames beginning with frame 705A in the 30 fps video output 730 may be blanked, blacked out, or be replaced with a pre-configured slate image; additionally, any audio or captioning may be muted. The starting frame 705B that is associated with the signal 712 may be the first blanked frame in the avail break in the video output 715, such that the actual beginning of the avail break is properly aligned with the signal. Similarly, the starting frame 705A that is associated with the signal 712 may be the first blanked frame in the avail break in the video output 730, such that the actual beginning of the avail break is properly aligned with the signal. Using a prior approach in which frame-rate conversion was performed after avail blanking, the resulting output could have had a misalignment between the first blanked frame and the signal, such that the signal could have been incorrectly associated with a different frame than the first blanked frame. By instead performing avail blanking only after frame-rate conversion has been performed, misalignment of the signal 712 and the first frame in the avail break may be avoided. Using the prior approach in which frame-rate conversion was performed after avail blanking, the starting time of the avail break could have mapped to a frame occurring at a different time in the 30 fps output than in the 15 fps output. By selecting the starting frame in the video output having the lowest frame rate and modifying the avail break start time to the opening of that frame, the beginning of the avail break may be synchronized to the same time in multiple video outputs such as outputs 715 and 730. In a similar manner, the ending time of the avail break may be synchronized to the same time in multiple video outputs such as outputs 715 and 730.

Illustrative Computer System

In at least some embodiments, a computer system that implements a portion or all of one or more of the technologies described herein may include a computer system that includes or is configured to access one or more computer-readable media. FIG. 8 illustrates such a computing device 3000. In the illustrated embodiment, computing device 3000 includes one or more processors 3010A-3010N coupled to a system memory 3020 via an input/output (I/O) interface 3030. Computing device 3000 further includes a network interface 3040 coupled to I/O interface 3030.

In various embodiments, computing device 3000 may be a uniprocessor system including one processor or a multi-processor system including several processors 3010A-3010N (e.g., two, four, eight, or another suitable number). Processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In multiprocessor systems, each of processors 3010A-3010N may commonly, but not necessarily, implement the same ISA.

System memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processors 3010A-3010N.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 8 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:
1. A system, comprising:
one or more computing devices configured to implement a media streaming system, wherein the media streaming system is configured to:

acquire a video input, wherein the video input is associated with a starting point in time for a break, and wherein the video input has an input frame rate;

perform frame-rate conversion on the video input, wherein the frame-rate conversion generates a plurality of video outputs comprising at least a first video output having a first frame rate and a second video output having a second frame rate, wherein the first frame rate differs from the second frame rate;

select, from among the plurality of video outputs, a video output having a lowest frame rate;

select, in the video output having the lowest frame rate, a starting frame for the break, wherein the starting frame is selected based at least in part on proximity to the starting point in time for the break, and wherein the starting frame in the video output having the lowest frame rate occurs at the same point in time with respect to corresponding starting frames in one or more others of the plurality of video outputs;

perform blanking on the plurality of video outputs, wherein the blanking is synchronized across the plurality of video outputs to begin at the starting frame in the video output having the lowest frame rate and at the corresponding starting frames in the one or more others of the plurality of video outputs; and transmit, to one or more recipients, the plurality of video outputs having the blanking.

2. The system as recited in claim 1, wherein the starting frame and the corresponding starting frames comprise instantaneous decoder refresh (IDR) frames, wherein additional video content is inserted during the break by one or more downstream components based at least in part on a presence of the IDR frames.

3. The system as recited in claim 1, wherein the plurality of video outputs are associated with signals to indicate a beginning of the blanking, and wherein the signals are aligned with the starting frame and the corresponding starting frames in the plurality of video outputs.

4. The system as recited in claim 1, wherein frame rates of the one or more others of the plurality of video outputs are integer multiples of the lowest frame rate.

5. A computer-implemented method, comprising:
performing, by one or more computing devices that implement a media streaming system:
performing frame-rate conversion on a video input, wherein the video input is associated with a starting point in time for a break, wherein the video input has an input frame rate, wherein the frame-rate conversion generates one or more video outputs, and wherein one or more frame rates of at least a portion of the one or more video outputs differ from the input frame rate; and
performing blanking on the one or more video outputs after performing the frame-rate conversion, wherein the blanking comprises modifying or inserting a sequence of frames, and wherein a beginning of the sequence of frames is aligned with an indication of a start of the break.

6. The method as recited in claim 5, wherein the video outputs comprise at least a first video output having a first frame rate and a second video output having a second frame rate, wherein the first frame rate differs from the second frame rate, and wherein the sequence of frames in the first video output begins and ends at the same times as the sequence of frames in the second video output.

7. The method as recited in claim 6, further comprising:
selecting, from among the video outputs, a video output having a lowest frame rate; and
selecting, in the video output having the lowest frame rate, a starting frame for the break, wherein the starting frame is selected based at least in part on proximity to the starting point in time for the break, and wherein the starting frame in the video output having the lowest frame rate is synchronized with respect to corresponding starting frames in one or more others of the video outputs.

8. The method as recited in claim 6, wherein the first frame rate is an integer multiple of the second frame rate, or wherein the second frame rate is an integer multiple of the first frame rate.

9. The method as recited in claim 6, wherein the first frame rate or the second frame rate is not an integer multiple of the input frame rate.

10. The method as recited in claim 6, further comprising:
selecting, from among the video outputs, a video output having a lowest frame rate; and
selecting, in the video output having the lowest frame rate, an ending frame for the break, wherein the ending frame is selected based at least in part on proximity to an ending point in time for the break, and wherein the ending frame in the video output having the lowest frame rate is synchronized with respect to corresponding ending frames in one or more others of the video outputs.

11. The method as recited in claim 10, wherein the indication of the start of the break comprises an instantaneous decoder refresh (IDR) frame at the beginning of the sequence of frames, and wherein additional video content is inserted during the break by one or more downstream components based at least in part on a presence of the IDR frame.

12. The method as recited in claim 5, wherein the one or more computing devices that implement the media streaming system are provisioned in a multi-tenant provider network.

13. A non-transitory computer-readable storage medium storing program instructions computer-executable to perform:
performing frame-rate conversion on a video input, wherein the frame-rate conversion generates a plurality of video outputs, and wherein the video input is associated with a starting point in time for a break;
selecting, from among the plurality of video outputs, a video output having a lowest frame rate;
selecting, in the video output having the lowest frame rate, a starting frame for the break, wherein the starting frame is selected based at least in part on proximity to the starting point in time for the break, and wherein the starting frame in the video output having the lowest frame rate is synchronized with respect to corresponding starting frames in one or more others of the plurality of video outputs; and
performing blanking on the plurality of video outputs, wherein the blanking is synchronized across the plurality of video outputs to begin at the starting frame in the video output having the lowest frame rate and at the corresponding starting frames in the one or more others of the plurality of video outputs.

14. The non-transitory computer-readable storage medium as recited in claim 13, wherein the program instructions are further computer-executable to perform:

selecting, in the video output having the lowest frame rate, an ending frame for the break, wherein the ending frame is selected based at least in part on proximity to an ending point in time for the break, and wherein the ending frame in the video output having the lowest frame rate occurs at a same time with respect to corresponding ending frames in one or more others of the plurality of video outputs.

15. The non-transitory computer-readable storage medium as recited in claim 13, wherein the first frame rate is an integer multiple of the second frame rate, or wherein the second frame rate is an integer multiple of the first frame rate.

16. The non-transitory computer-readable storage medium as recited in claim 13, wherein the first frame rate or the second frame rate is not an integer multiple of the input frame rate.

17. The non-transitory computer-readable storage medium as recited in claim 13, wherein the starting frame and the corresponding starting frames comprise instantaneous decoder refresh (IDR) frames.

18. The non-transitory computer-readable storage medium as recited in claim 13, wherein additional video content is inserted during the break by one or more downstream components based at least in part on a presence of the IDR frames.

19. The non-transitory computer-readable storage medium as recited in claim 13, wherein the plurality of video outputs are associated with signals to indicate a beginning of the blanking, and wherein the signals are aligned with the starting frame and the corresponding starting frames in the plurality of video outputs.

20. The non-transitory computer-readable storage medium as recited in claim 13, wherein one or more computing devices that implement the blanking are provisioned in a multi-tenant provider network.

* * * * *